United States Patent
Kim et al.

(10) Patent No.: US 6,597,395 B1
(45) Date of Patent: Jul. 22, 2003

(54) BLACK LEVEL CALIBRATION APPARATUS FOR VIDEO CAMERA

(75) Inventors: Min Gyu Kim, Seoul (KR); Chul Sang Jang, Daeku (KR)

(73) Assignee: Hyundai Electronics Industries Co., Ltd., Kyoungki-Do (KR)

( * ) Notice: Subject to any disclaimer, the term of this patent is extended or adjusted under 35 U.S.C. 154(b) by 0 days.

(21) Appl. No.: 09/250,184

(22) Filed: Feb. 16, 1999

(30) Foreign Application Priority Data

Aug. 24, 1998 (KR) .......................................... 98-34271

(51) Int. Cl.[7] .............................................. H04N 5/228
(52) U.S. Cl. .................................. 348/222.1; 348/229.1
(58) Field of Search ......................... 348/207.99, 220.1, 348/222.1, 229.1, 231.99, 231.3, 223.1, 241, 243, 691, 692, 255; H04N 5/335

(56) References Cited

U.S. PATENT DOCUMENTS 5,018,012 A * 5/1991 Tsuji .......................... 348/691
5,430,482 A * 7/1995 Kim ....................... 348/333.01

* cited by examiner

*Primary Examiner*—Tuan Ho
(74) *Attorney, Agent, or Firm*—Birch, Stewart, Kolasch & Birch, LLP

(57) ABSTRACT

The black level calibration apparatus includes a black level clamp circuit which generates a black level clamp signal based on a calibrated reference voltage. A correlated double sampling/automatic gain control (CDS/AGS) circuit performs sample/hold and automatic gain control operations on an analog image signal based on the black level clamping signals. An analog-to-digital converter converts the analog image output from the CDS/AGS circuit into a digital image signal. A control signal setting circuit compares the black level value of the digital image signal with a black level calibration value, and sets a digital control signal based on the comparison. A reference voltage calibration circuit generates the calibrated reference voltage in accordance with the digital control signal.

11 Claims, 2 Drawing Sheets

BLACK LEVEL CALIBRATION APPARATUS FOR VIDEO CAMERA

BACKGROUND OF THE INVENTION

1. Field of the Invention

The present invention relates to a video camera, and more particularly, to an improved black level calibration apparatus for a video camera which is capable of automatically calibrating a black level of an applied image signal inside a chip.

2. Description of the Background Art

FIG. 1 is a block diagram illustrating an interior of a conventional video camera. As shown therein, the conventional video camera includes a charge coupled device (hereinafter, referred to as CCD) 100 for converting, to an electrical signal, the optical image received through a lens and outputting a resultant value, a correlated double sampling (hereinafter, referred to as CDS) and automatic gain control circuit (hereinafter, referred to as AGC) circuit 110 for carrying out sample/hold and automatic gain control with regard to the output signal of CCD 100, a reference voltage generator 130 for generating an upper phase reference voltage $V_T$ and a lower phase reference voltage $V_B$, an analog/digital converter (hereinafter, referred to as A/D converter) 120 for converting the analog image signal outputted from the CDS/AGC 110 to a digital image signal in accordance with reference signals outputted from the reference voltage generator 130, and a clamp circuit 140 for clamping a black level value of the analog image signal outputted from the CDS/AGC circuit 110 to the lower phase reference voltage value $V_B$ outputted from the reference voltage generator 130 so that these values become equal and feeding back the clamped value to the CDS/AGC circuit 110, and a potentiometer R for varying the lower phase reference value $V_B$ received by the A/D converter 120.

The black level calibrating process of a video camera according to the conventional art will now be described.

First, the output signal of the CCD 100 realizes its sample/hold and automatic gain control through the CDS/AGC 110, and is converted to a normal analog image signal. The analog image signal is converted to a digital image signal by the A/D converter 120.

The A/D converter 120 converts the analog image signal to a digital image signal with reference to the upper phase reference voltage $V_T$ and the lower phase reference voltage $V_B$, as varied by a potentiometer R, generated by the reference voltage generator 130 and outputs a resultant value.

At this time, since the black level value of the applied analog image signal has to correspond to the lower phase reference voltage value $V_B$, there is provided a black level clamp circuit 140.

The black level clamp circuit 140 receives a black level signal periodically generated from the CDS/AGC circuit 110, clamps the received signal to a level of the lower phase reference voltage $V_B$ generated by the reference voltage generator 130 and feeds the result back to the CDS/AGC circuit 110.

Therefore, although the lower phase reference voltage $V_B$ of the A/D converter 120 and the black clamping level of the black level clamp circuit 140 are theoretically equal, it is difficult for an accurate clamping to be ideally carried out due to mismatch with a system or device. Also, there may occur a disadvantage in which a black level should be controlled depending upon the quality of a particular image requested by a customer.

In order to eliminate such a disadvantage, the conventional video camera, as shown in FIG. 1, provides the potentiometer R (i.e., variable resistance) attached to a lower phase reference voltage output terminal of the reference voltage generator 130 to appropriately and manually control the lower phase reference voltage $V_B$ received by the A/D converter 120. The value from the variable resistance R is applied to the A/D converter 120, whereby the lower phase reference voltage $V_B$ of the A/D converter 120 is controlled differently from the reference voltage applied to the black level clamp circuit 140.

Although the conventional circuit described above has not been problematic in the conventional system in which respective functions of CDS/AGC, A/D conversion and reference voltage generation are realized in separate chips by attaching a variable resistance outside the chip, a considerable disadvantage is incurred in the case where these function are placed on a single chip.

Further, since the reference voltage applied to the A/D converter 120 is varied, an internal conversion range of the A/D converter is varied, which results in deterioration of the A/D converter function.

SUMMARY OF THE INVENTION

In the black level calibration apparatus according to the present invention, a reference voltage generator generates a reference voltage, and a correlated double sampling/automatic gain control (CDS/AGS) circuit perform sample/hold and automatic gain control operations on an analog image signal based on a black level clamping signal. The apparatus also includes a black level clamping circuit which generates the black level clamping signal based on a calibrated reference voltage. An analog to digital converter converts the analog image signal output from the CDS/AGS circuit into a digital image signal. A control signal setting circuit compares the black level of the digital image signal with a black level calibration value, and sets a digital control signal based on the comparison. A reference voltage calibration circuit generates the calibrated reference voltage in accordance with the digital control signal. Because these circuits are included on a single chip and do not require an external variable resistance, the problems and disadvantages discussed above with respect to the conventional art are overcome.

The object and advantages of the present invention will become more readily apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

With reference to the accompanying drawings, the preferred embodiments of the present invention will now be described.

Figure 1:
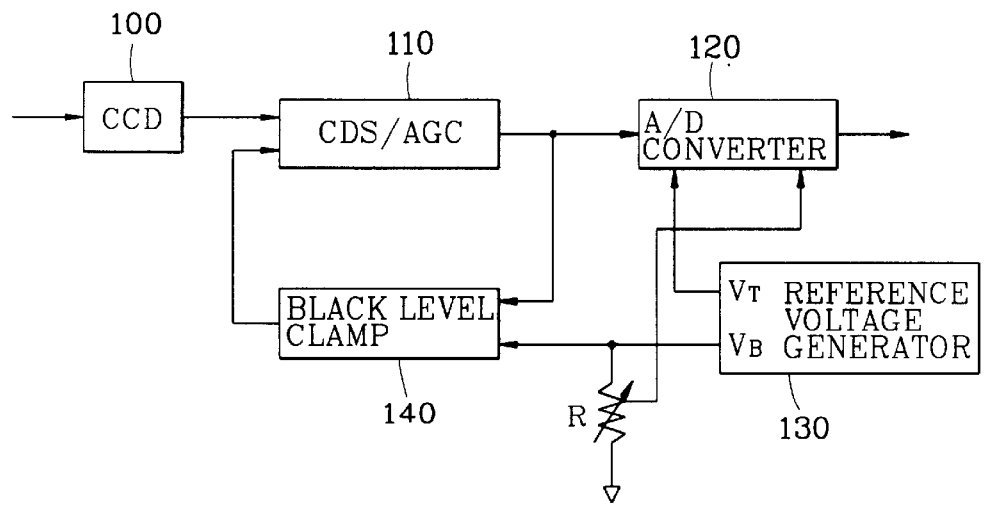
FIG. 1 is an internal block diagram illustrating a conventional black level calibration apparatus for a video camera.
Figure 2:
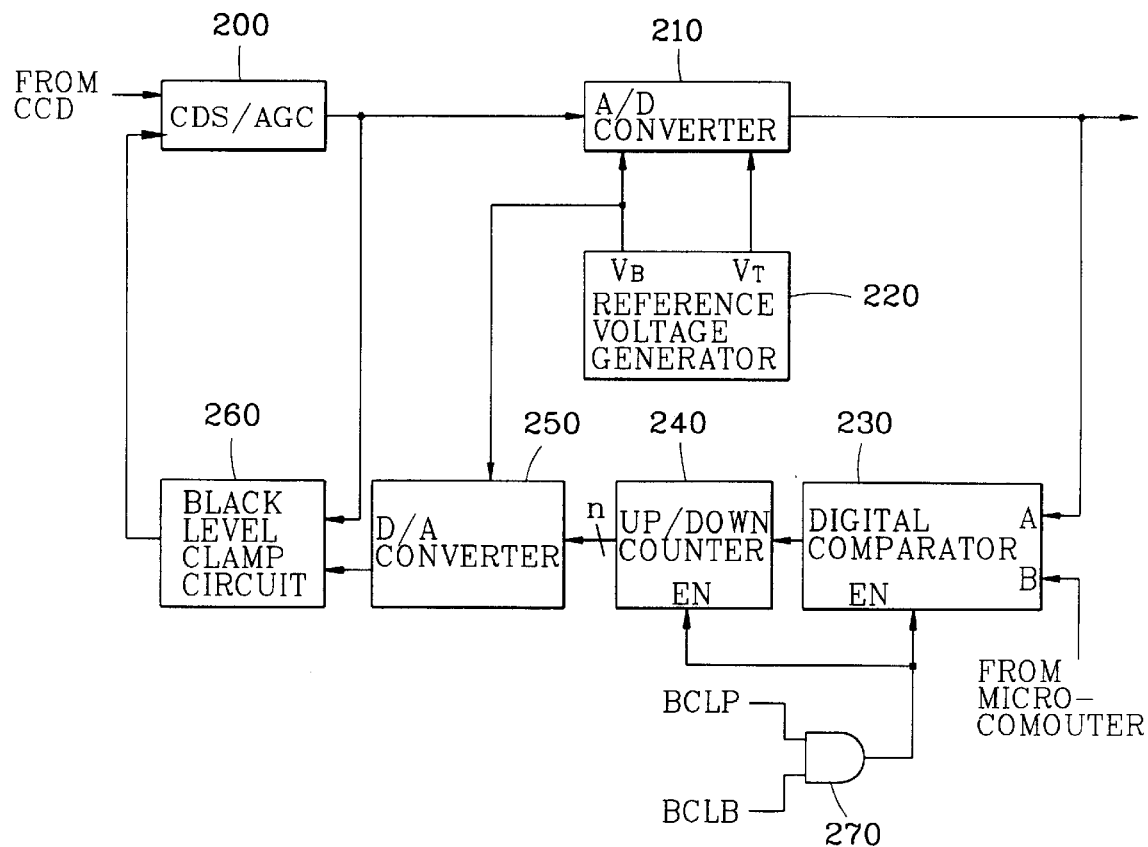
FIG. 2 is an internal block diagram illustrating a black level calibration apparatus for a video camera according to the present invention.

FIG. 2 is a black level calibration apparatus for a video camera according to the preferred embodiment of the present invention. As shown therein, the apparatus includes a CDS/AGC circuit 200 for carrying out sample/hold and automatic gain control with regard to an output signal of a charged couple device (CCD), a reference voltage generator 220 for generating an upper phase reference voltage $V_T$ and a lower phase reference voltage $V_B$, an A/D converter 210 for converting an analog image signal that has passed through the CDS/AGC 200 to a digital image signal in accordance with the upper and lower phase reference voltages $V_T$ and $V_B$, a digital comparator 230 for comparing a black level of the digital image signal outputted from the A/D converter 210 with a black level calibration value received from a microcomputer and outputting a compared resultant value accordingly, an up/down counter 240 for raising or lowering a present count value in accordance with an output signal of the digital comparator 230 for thereby outputting as an n-bit control signal, a D/A converter 250 for outputting a voltage value selected from a plurality of divided voltages according to a control signal applied from the up/down counter 240, a black level clamp circuit 260 for clamping a black level of an analog image signal from the CDS/AGC circuit 200 in accordance with the voltage value selected by the D/A converter 250 and feeding back the clamped value to the CDS/AGC circuit 200, and an A/D gate 270 for applying an enable signal EN to the digital comparator 230 and the up/down counter 240 when the black level clamping signal BCLP and the black level calibration signal BCLB are both turned on.

The operational process of the black level calibration apparatus for a video camera according to the preferred embodiment of the present invention will now be described in detail.

First, the signal outputted from the CCD undergoes sample/hold and automatic gain control while passing through the CDS/AGC circuit 200, and is transferred to the A/D converter 210.

The A/D converter 210 converts the analog image signal received from the CDS/AGC circuit 200 to a digital image signal with reference to the upper phase reference voltage $V_T$ and the lower phase reference voltage $V_B$ generated by the reference voltage generator 220.

At this time, in case the two input signals of the A/D gate 270, that is, the black level clamping signal BCLP and the black level calibration signal BCLB are both turned on, the enable signal EN is applied to the digital comparator 230 and the up/down counter 240, whereby the two blocks 230, 240 become operable.

Then, the digital comparator 230 compares the black level value A of the digital image signal received from the A/D converter 210 with a previously set black level calibration value B received from the microcomputer. If A>B, a "high" signal is outputted to the up/down counter 240, if A=B, an "IN" signal is outputted to the up/down counter 240, and if A<B, a "low" signal is outputted to the up/down counter 240.

The up/down counter 240 raises or lowers a present count value depending upon an output signal of the digital comparator 230. For example, when the output signal of the digital comparator 230 is at a high level, the present count value is lowered by "one", if at the low level, the present count value is raised by "one", and if at "IN", the count value remains unchanged, that is, the present count value is fixed.

The thusly determined n-bit control signal is applied to the D/A converter 250, and the D/A converter 250 increases or decreases the lower phase reference voltage $V_B$ generated by the reference voltage generator 220 in accordance with the n-bit control signal.

Figure 3:
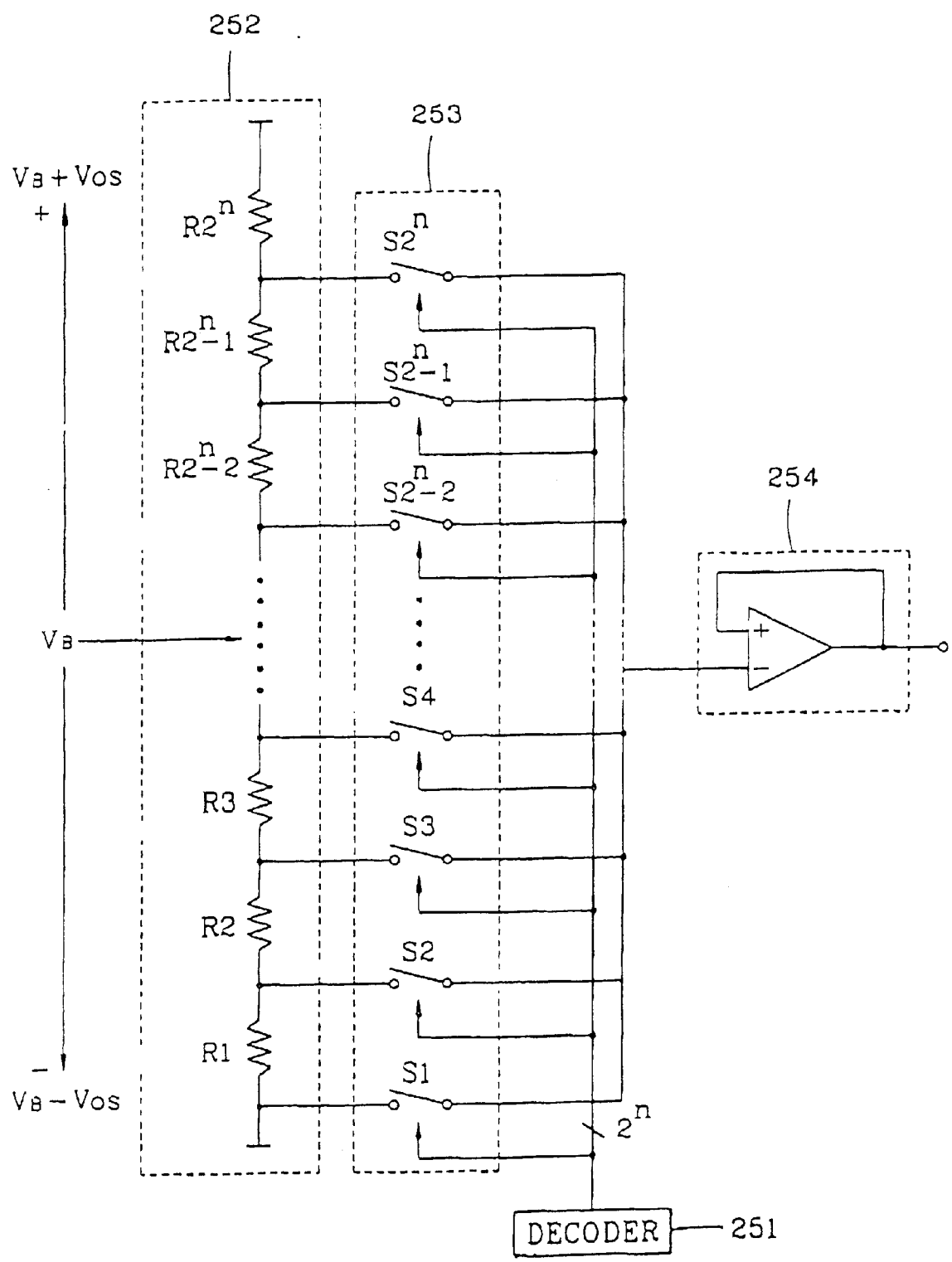
FIG. 3 is a detailed circuit view illustrating a D/A converter in the circuit of FIG. 2.

The architecture of the D/A converter 250 according to the preferred embodiment of the present invention will now be further described with reference to FIG. 3.

As shown therein, the D/A converter 250 includes a decoder 251 for decoding the n-bit digital control signal to $2^n$ bits. The D/A converter 250 also includes a voltage divider 252, a divided voltage selector 253 and an output buffer 254. The voltage divider 252 has a plurality of equal resistance resistors R1, R2, ... R$2^N$ connected in series between a summed voltage equal to the lower phase reference voltage $V_B$ plus a predetermined voltage $V_{os}$ and a difference voltage equal to the lower phase reference voltage $V_B$ plus the predetermined voltage $V_{os}$. The divided voltage selector 253 includes a plurality of switches S1, S2, ... S$2^n$. The switch S1 selectively connects the voltage $V_B + V_{os}$ to the output buffer 254 and each of the switches S2–S$2^n$ selectively connects a node between two of the resistors R1–R$2^n$ to the output buffer 254 based on the output of the decoder 251. Namely, the decoder 251 outputs $2^n$ bits in parallel, and each bit controls operation of a respective switch S1–S$2^n$. The output buffer 254 buffers and amplifies the voltage selected from the divided voltage selector 220 and outputs the resultant value.

The operation of the D/A converter 250 will now be described in further detail.

The difference of the voltages applied to both ends of the respective resistances is $(V_B + V_{OS}) - (V_B - V_{OS})/2^n(V)$, that is, $2V_{OS}/2^n(V)$.

For example, if $V_B = 1.0(V)$, $V_{OS} = 0.1(V)$, and n=3 are satisfied, 1.1(V) and 0.9(V) are respectively applied to the both ends of the voltage divider 252, and a row of eight identical resistances are serially connected between the two voltages, whereby the voltage difference of both of the resistance ends is 0.025(V) (i.e., 0.02(V)/8=0.025(V)).

A number $2^n$ of contacts between the respective resistances of the voltage divider 252 are connected to corresponding switches S1~S$2^n$. The switches S1~S$2^n$ are connected in common and applied to a non-inversion input terminal of an OPAMP (OPerational AMPlifier) serving as the output buffer 254.

At this time, the output signal of the decoder 251 decoding the n-bit digital control signal received from the up/down counter 240 into a $2^n$-bit signal is applied to respective switches (S1~S$2^n$) as a switching control signal.

Therefore, the respective switches S1~S$2^n$ of the divided voltage selector 253 become turned on/off in accordance with the digital control signal received from the decoder 251 so that one of the voltages divided in the voltage divider 252 is selected and outputted accordingly, and the output signal of the divided voltage selector 253 is amplified to an appropriate level through the output buffer 254.

That is, the switching control signal outputted from the decoder 251 is set such that there is selected a voltage lower than the present lower phase reference voltage $V_B$ by a predetermined level in a case the present black level value A is larger than a required black level calibration value B, and there is selected a voltage higher than the present lower phase reference voltage $V_B$ by a predetermined level when the present black level value A is less than a required black level calibration value B in the opposite case.

When the calibrated reference voltage value is applied to the black level clamp circuit 260 as a reference voltage, the black level clamp circuit 260 clamps the black level of the analog image signal received from the CDS/AGC circuit 200 and feeds back the resultant value to the CDS/AGC circuit 200.

The calibrated and reapplied present black level A and the black level calibration value B received from the microcomputer are continuously compared by repeating the above-described process until the two values are determined to be identical; and thereby calibrate the black level value to a predetermined value.

As described above, the black level calibration apparatus for a video camera according to the present invention overcomes the problems in the conventional art in which an additional external resistance is provided and manually controlled. The present invention enables an accurate calibration to a black level value determined in accordance with the control signal of the microcomputer, and the reference voltage applied to the black level clamp circuit is varied while maintaining unchanged the reference voltage applied to the A/D converter, thereby preventing the operation of the A/D converter from deteriorating.

As the present invention may be embodied in several forms without departing from the spirit of essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within meets and bounds of the claims, or equivalences of such meets and bounds are therefore intended to embrace the appended claims.

What is claimed is:

1. A black level calibration apparatus, comprising:
   a correlated double sampling/automatic gain control (CDS/AGS) circuit performing sample/hold and automatic gain control operations on an analog image signal based on a black level clamping signal;
   a black level clamp circuit generating the black level clamping signal based on a calibrated reference voltage and feeding back the black level clamping signal to the CDS/AGS circuit;
   an analog/digital (A/D) converter converting the analog image signal output from the CDS/AGS circuit into a digital image signal;
   a control signal setting means for comparing a black level value of the digital image signal with a black level calibration value, and for setting a digital control signal based on the comparison; and
   a reference voltage calibration means for generating the calibrated reference voltage in accordance with the digital control signal.

2. The apparatus of claim 1, wherein the control signal setting means sets the digital control signal such that the reference voltage calibration means lowers the calibrated reference voltage when the black level value of the digital image signal is greater than the black level calibration value.

3. The apparatus of claim 1, wherein the control signal setting means sets the digital control signal such that the reference voltage calibration means raises the calibrated reference voltage when the black level value of the digital image signal is less than the black level calibration value.

4. The apparatus of claim 1, wherein the control signal setting means sets the digital control signal such that the reference voltage calibration remains unchanged when the black level value of the digital image signal is equal to the black level calibration value.

5. A black level calibration apparatus, comprising:
   a correlated double sampling/automatic gain control (CDS/AGS) circuit performing sample/hold and automatic gain control operations on an analog image signal based on a black level clamping signal;
   a black level clamp circuit generating the black level clamping signal based on a calibrated reference voltage;
   an analog/digital (A/D) converter converting the analog image signal output from the CDS/AGS circuit into a digital image signal;
   a control signal setting means for comparing a black level value of the digital image signal with a black level calibration value, and for setting a digital control signal based on the comparison, the control signal setting means comprising a digital comparator comparing a black level value of the digital image signal with the black level calibration value and a counter counting up/down based on output from the digital comparator to generate the digital control signal; and
   a reference voltage calibration means for generating the calibrated reference voltage in accordance with the digital control signal.

6. The apparatus of claim 5, wherein the reference voltage calibration means comprises:
   a decoder decoding the digital control signal into a decoded signal having a first predetermined number of bits;
   a voltage divider generating a second predetermined number of selectable reference voltages, each selectable reference voltage differing from another selectable reference voltage by a predetermined voltage;
   a voltage selector selecting one of the second predetermined number of selectable reference voltages based on the decoded signal.

7. The apparatus of claim 6, wherein the reference voltage calibration means further comprises:
   a buffer buffering and amplifying the selected selectable reference voltage.

8. A black level calibration apparatus, comprising:
   a correlated double sampling/automatic gain control (CDS/AGS) circuit performing sample/hold and automatic gain control operations on an analog image signal based on a black level clamping signal;
   a black level clamp circuit generating the black level clamping signal based on a calibrated reference voltage;
   an analog/digital (A/D) converter converting the analog image signal output from the CDS/AGS circuit into a digital image signal;
   a control signal setting means for comparing a black level value of the digital image signal with a black level calibration value, and for setting a digital control signal based on the comparison; and
   a reference voltage calibration means for generating the calibrated reference voltage in accordance with the digital control signal, the reference voltage calibration means comprising:
      a decoder decoding the digital control signal into a decoded signal having a first predetermined number of bits;

a voltage divider generating a second predetermined number of selectable reference voltages, each selectable reference voltage differing from another selectable reference voltage by a predetermined voltage; and a voltage selector selecting one of the second predetermined number of selectable reference voltages based on the decoded signal.

9. The apparatus of claim 8, wherein the reference voltage calibration means further comprises:

a buffer buffering and amplifying the selected selectable reference voltage.

10. A black level calibration apparatus, comprising:

a correlated double sampling/automatic gain control (CDS/AGS) circuit performing sample/hold and automatic gain control operations on an analog image signal based on a black level clamping signal;

a black level clamp circuit generating the black level clamping signal based on a calibrated reference voltage;

an analog/digital (A/D) converter converting the analog image signal output from the CDS/AGS circuit into a digital image signal;

a control signal setting means for comparing a black level value of the digital image signal with a black level calibration value, and for setting a digital control signal based on the comparison;

a reference voltage calibration means for generating the calibrated reference voltage in accordance with the digital control signal; and a reference voltage generator generating at least one phase reference voltage, wherein the A/D converter converts the analog image signal into the digital image signal based on the phase reference voltage, and the reference voltage calibration means generates the calibrated reference voltage based on the digital control signal and the phase reference voltage.

11. A black level calibration apparatus, comprising:

a correlated double sampling/automatic gain control (CDS/AGS) circuit performing sample/hold and automatic gain control operations on an analog image signal based on a black level clamping signal;

a black level clamp circuit generating the black level clamping signal based on a calibrated reference voltage and feeding back the black level clamping signal to the CDS/AGS circuit;

an analog/digital (A/D) converter converting the analog image signal output from the CDS/AGS circuit into a digital image signal;

a control signal setting means for comparing a black level value of the digital image signal with a black level calibration value, and for setting a digital control signal based on the comparison; and a reference voltage calibration means for generating the calibrated reference voltage in accordance with the digital control signal and a phase reference voltage.

* * * * *